2,999,760
CELLULOSE ACETATE COMPOSITION
Arthur Ferreira Cacella, Waynesboro, Va., and Helen Lyng White, Chadds Ford, Pa., assignors to E. I. du Pont de Nemours and Company, Wilmington, Del., a corporation of Delaware
No Drawing. Filed May 23, 1958, Ser. No. 737,231
7 Claims. (Cl. 106—184)

This invention relates to a novel and useful composition of matter. More particularly, it relates to a solution of cellulose acetate which is useful in the preparation of shaped articles.

The use of cellulose triacetate (acetylated cellulose containing from 2.7 to 3.0 acetyl group per glucose unit, i.e., from 59 to 62.5% combined acetic acid) in the manufacture of shaped articles, and particularly, filamentary structures, is of considerable interest because of the attractive thermophysical properties of the articles so composed. However, the commercial utilization of cellulose triacetate has been severely limited by its solubility in conventional solvents, necessitating the present practice of saponifying or "ripening" back to the acetone soluble or "secondary" cellulose acetate. Although cellulose triacetate is soluble in chlorinated hydrocarbons, e.g., methylene chloride, with or without the addition of small amounts of alcohol, the toxicity, corrosiveness, and volatility of these solvents ordinarily excludes them from use.

The prior art describes certain processes for preparing solutions of cellulose triacetate from more conventional and desirable solvents. These processes in general comprise cooling a mixture of cellulose triacetate and the solvent to about −50° C. to form a swollen gel, which, when slowly warmed with stirring to room temperature, form relatively fluid solutions. This is the so-called "cold process," and is described in U.S.P. 2,346,350 to Berl and Berl and in U.S.P. 2,362,182 to Baker. However, the "solutions" prepared by these processes are not suited as such for use in commercial manufacturing operations, particularly, in the evaporative or "dry" spinning of filamentary structures because of their propensity to gel, their poor filterability, and their low viscosity at conventional solids concentrations. These serious deficiencies have hindered the commercial use of the "cold process" technology.

The technical prerequisites of solutions used for commercial "dry" evaporative spinning of filamentary structures are threefold. The solutions should be stable on standing, i.e., they should not gel or decompose when stored for extended periods of time. Adequate solution stability permits the preparation of large batches of solutions, "resting" to eliminate dissolved gases, and the various blending and transporting operations. The solutions should also possess a satisfactory degree of filterability, in order that foreign particles which would otherwise clog the spinneret or cause product defects may be removed. In addition, the solutions should have suitable viscosity at acceptable levels of concentration. If the solution viscosity is too high, the pumping and filtering equipment cannot function properly. If the solution viscosity is too low, serious defects occur in the product. These three factors control to an appreciable extent the product properties and process economics and are collectively a measure of "solution spinnability."

Granting that suitable solutions of cellulose triacetate could be prepared from acceptable solvents, the properties of the filamentary structures produced still depend on the particular composition being spun. For example, the prior art has disclosed the entire cellulose triacetate range of combined acetic acid as compositions suitable for the preparation of filamentary structures. However, within that broad area exists a wide variation of properties, most of which are dependent upon the amount of combined acetic acid in the cellulose triacetate, i.e., the degree of acetyl substitution. At lower degrees of acetylation within the "triacetate" range, the material resembles "secondary" cellulose acetate in many of its physical properties, excluding acetone solubility. There would be little advantage in preparing shaped articles from such compositions. At the high levels of acetyl substitution, e.g., the "nominal triacetate," which contains upwards from about 61% combined acetic acid, the filamentary structures can be heat-set, due to their tendency to crystallize. When fabrics made from such yarns are heat-set, they exhibit good glazing and wrinkle resistance, pleat and crease retention during the ordinary conditions of use, and have improved resistance to heat, e.g., as occurs in the ironing of the said fabrics.

As the level of acetyl substitution is increased, however, other properties such as dyeability, delusterability, and percent moisture regain are diminished. Also, at the higher levels of acetylation, it becomes more difficult to maintain the polymer chain length (the degree of polymerization) during acetylation of the cellulose upon which important mechanical properties of the filamentary structures are dependent. The practical implication of these deficiencies is the outstanding need for greatly improved yarn toughness in weaving and higher abrasion resistance, especially during laundering.

It is an object of the present invention therefore to provide a composition comprising a highly acetylated cellulose in a noncorrosive, readily available solvent. A further object is to provide a dry-spinning process for the formation of filamentary structures. A still further object is to provide filamentary structures which exhibit the heat-set ability of nominal cellulose triacetate but which have improved toughness and abrasion resistance. Other objects will appear hereinafter as the description of the invention proceeds.

These objects are accomplished by the present invention which provides a composition comprising cellulose acetate having a combined acetic acid value of from 59.8 to 60.6% and a mixture of methyl acetate and acetone containing from about 20 to about 80% by weight of methyl acetate, with the cellulose acetate being present in the composition in amounts of from about 16 to about 18% by weight. In a preferred embodiment of the present invention, the composition is a solution which consists essentially of the stated ingredients. In this preferred solution, the cellulose acetate has a combined acetic acid value of about 60.0% and the solvent contains about 64% by weight of methyl acetate. The term "consisting essentially of" is used to signify that minor amounts of other materials may be present in the solution providing they do not effect the nature (i.e., spinnability and the like) of the solution.

The compositions of the present invention are prepared by contacting the cellulose acetate and the methyl acetate/acetone at a temperature below about −20° C. and thereafter raising the temperature of the mixture until a fluid solution is formed. In a preferred embodiment of the invention, a mixture of the ingredients at a temperature of about −50° C. is warmed with stirring to room temperature to form the composition.

The term "contacting" is used to signify that the ingredients are in a mixed state at this stage of the process. They may, of course, be mixed together below −20° C. or they may be mixed at a higher temperature and cooled below this temperature. In either event, they come in "contact" with one another at the lower temperature. By such a process, stable solutions of cellulose acetate are formed which are suitable for use in the conventional dry-spinning apparatus.

The present invention also provides a novel yarn and fabric formed by using the above compositions. It thus provides a heat-set yarn consisting essentially of cellulose acetate having a combined acetic acid value of from 59.8 to 60.6% and fabrics comprising such yarns. When yarns are produced by dry-spinning the above compositions, the product is a relatively non-crystalline yarn which may be heat-set. In heat-setting, the non-crystalline product is partially crystallized by heating, preferably, in the fabric form. As a result of this treatment, its value is greatly enhanced because the yarns become more dimensionally stable (less wrinkling, shrinking, shape loss) and possess a much higher softening temperature. Heat-setting conditions which give this result are dry heat at 210 to 250° C. for periods of 20 to 180 seconds depending on the fabric construction, or steam at 10 to 50 p.s.i.g. for times of from 5 to 30 minutes. The first treatment may also be followed by exposure to steam at atmospheric pressure (substantially 100° C.) for 10 to 60 minutes. The two conditions employing steam are particularly useful for bringing out the full property potential of the fibers, especially the wet recovery and the resistance of the fabric to wrinkles during washing.

The invention will now be further described in the following specific examples, which are to be regarded solely as illustrative, and not as restricting the scope of the invention. For the purpose of comparison, a yarn prepared in accordance with the present invention is compared to a yarn prepared from nominal cellulose triacetate. The nominal cellulose triacetate yarn is chosen since the prior art has consistently presumed that cellulose acetate yarns prepared from this composition have the optimum physical properties that can be obtained. In these examples, parts and percentages are reported on a weight basis. The W.S. viscosity in the following examples is determined from measurements on a 0.0913% solution of the polymer in 92% acetic acid at 25° C., in a modified Ostwald viscometer as follows:

$$W.S.\ viscosity = (X-1)1000$$

where X, the relative viscosity, is the ratio between the flow time of the solution and solvent in the viscometer. The combined acetic acid is determined by the modified Eberstadt method, Ind. and Eng. Chem. (Anal. edition), 13, 369 (1941).

EXAMPLE I

Yarn A

The composition of the present invention is prepared and dry-spun by the following procedure. Seventeen grams of cellulose acetate flake having a W.S. viscosity of 310 and containing 60.0% combined acetic acid are added to 83 grams of a solvent mixture containing 64 parts of methyl acetate and 36 parts of acetone, and mixed with a high-shear stirrer. The resulting dispersion is cooled to about $-50°$ C. with stirring, and maintained at that temperature for 30 minutes to allow penetration of the solvent into the flake. The slurry is allowed to warm to room temperature with stirring. The resulting solution is free from suspended and undissolved particles, and has viscosity of 273 poises at 40° C. The solution is spun into 75 denier, 24 filament yarn at a rate of 400 yards per minute by the standard dry-spinning procedure using the following conditions:

| | |
|---|---|
| Spinneret hole size_____mm__ | 0.045 |
| Spinning solution temperature_____° C__ | 90 |
| Air temperature in spinning tube_____° C__ | 90 |

The physical properties of the as-spun yarn are reported in Table I under yarn A.

Yarn B

A conventional cellulose triacetate yarn is prepared by the following procedure. 21.5 grams of cellulose acetate having a W.S. viscosity of 247 and containing 61.1% combined acetic acid (nominal triacetate) is dissolved in 78.5 grams of methylene chloride/methanol (90/10 by weight). The solution is spun by the standard dry-spinning procedure into a 75 denier, 20 filament yarn at 400 y.p.m. using the following conditions (which are found to give the best fiber properties):

| | |
|---|---|
| Spinneret hole size_____mm__ | 0.040 |
| Spinning solution temperature_____° C__ | 70 |
| Air temperature in spinning tube_____° C__ | 125 |

The properties of the as-spun yarn are reported in Table I under yarn B.

TABLE I

| | Yarn A | Yarn B |
|---|---|---|
| Straight T/E [1] | 1.54/35 | 1.17/28 |
| Loop T/E | 1.55/34 | 1.08/21 |
| Straight T/E, 8 t.p.i. [2] | 1.6/35 | 1.1/25 |
| 64 t.p.i. | 1.3/20 | 0.9/12 |

[1] Tenacity, grams per denier/elongation, percent at break.
[2] Turns per inch.

As shown by Table I, the yarns prepared using the composition of the present invention have both a higher tenacity and a greater percent elongation at break.

Further tests show that the compositions of the present invention can be readily spun into yarns having a lower denier per filament than can the above-mentioned methylene chloride/methanol composition. When using the methylene chloride/methanol composition of the prior art, the lowest denier per filament obtainable is about 3.7. When using the composition of the present invention, the denier per filament can be lowered to about 1.9. Such improvement leads to lighter weight fabrics of improved aesthetics.

The yarns A and B are heat-set with dry heat and with steam respectively. Dry heat-setting is accomplished by exposing the yarn to a 225° C. dry atmosphere for a period of 75 seconds. Wet heat-setting is accomplished by exposing the yarn to an atmosphere of steam at 25 p.s.i.g. for a time of 30 minutes. Exposure times at either condition are sufficient to cause crystallization, as measured by X-ray diffraction data. The properties of the heat-set yarns are recorded in Table II.

TABLE II

| | Yarn A | Yarn B |
|---|---|---|
| Dry set, straight T/E: | | |
| 8 t.p.i. | 0.96/33 | 0.82/18 |
| 16 t.p.i. | 0.99/34 | 0.96/23 |
| 32 t.p.i. | 0.95/32 | 0.90/20 |
| Steam set, straight T/E: | | |
| 8 t.p.i. | 1.08/34 | 0.96/21 |
| 16 t.p.i. | 1.15/36 | 1.02/23 |
| 32 t.p.i. | 1.02/33 | 0.95/22 |

Plain weave fabrics (180 warp x 64 filling construction) are prepared from yarns A and B and the glazing temperature, stiffness temperature, and zero-strength temperature for each is determined after heat-setting in 25 p.s.i.g. steam for 30 minutes. It is found that all of these temperatures for both yarns A and B fall within the range 265 to 277° C. This shows that there is no substantial difference in these temperatures of the two yarns, although, as shown above, yarn A has improved tensile properties. When a fabric is woven with a yarn prepared from cellulose acetate having a combined acetic acid value below 59.8%, however, there is an undesirable sharp drop in all of these temperatures. For example, when the acetic acid value is 59.2%, the glazing, stiffness and zero-strength temperatures range from 245 to 249° C. and when the combined acetic acid value is 54.9%, the temperatures range from 226 to 233° C.

The yarns A and B (prepared above) are tested for abrasion properties along with the plain weave fabric prepared from these yarns. The measurements are made as-spun (or as-woven) and after dry- and steam-setting as previously described. The fabrics are tested both wet and dry, using the well-known Stoll apparatus with a three-pound backweight and a one-half-pound headweight. The wet samples are prepared by soaking the fabrics in a ½% detergent solution for 15 minutes. Yarn to yarn abrasion data are measured by an apparatus which consists of a reciprocating bar mounted three inches above a horizontal Alsimag pin, ⅛ inch diameter. The yarn is attached to the reciprocating bar, passes around the pin (360°), around the segment from the bar to the pin (180°), then 90° around the pin in the direction whence it came, the free end hanging vertically and attached to a 25.5 gram weight. The motion of the bar causes the yarn to rub on itself and on the Alsimag pin, finally causing the yarn to break. Results of these measurements, recorded as "cycles to break," are given in Table III below.

TABLE III

|  | Yarn A | Yarn B |
|---|---|---|
| Yarn/yarn abrasion: |  |  |
| As-spun | 522 | 197 |
| Dry set | 841 | 306 |
| Steam set | 581 | 230 |
| Dry stoll fabric (warp/fill): |  |  |
| As-woven | 286/345 | 118/158 |
| Dry set | 400/245 | 132/150 |
| Steam set | 300/450 | 282/302 |
| Wet stoll fabric abrasion (warp/fill): |  |  |
| As-woven | 866/615 | 215/225 |
| Dry set | 1,198/730 | 260/190 |
| Steam set | 762/730 | 335/300 |

EXAMPLE II

A series of solutions of cellulose triacetate having a W.S. viscosity of 310, and containing 60.0% combined acetic acid are prepared in acetone, methyl acetate, and mixtures of the two. All solutions are prepared as described in Example I. The solution concentration ("percent solids") is varied from 15 to 19%, the most useful springing concentrations. These results are recorded in Table IV, where the solution properties are summarized.

TABLE IV

| Solvent composition, percent | | Percent spinnability at solids level of— | | | | |
|---|---|---|---|---|---|---|
| Acetone | MeOAc | 15 | 16 | 17 | 18 | 19 |
| 100 | 0 | LV | LV | BL | US | US |
| 90 | 10 | LV | LV | BL | US | US |
| 80 | 20 | LV | LV | S | S | US |
| 70 | 30 | LV | S | S | S | US |
| 40 | 60 | LV | S | S | S | US |
| 30 | 70 | LV | S | S | S | US |
| 20 | 80 | LV | S | S | S | US |
| 10 | 90 | LV | US | US | US | US |
| 0 | 100 | LV | US | US | US | US |

S—Spinnable solutions.
LV—Solution viscosity too low for spinning.
BL—Borderline spinnability; not suitable for a process.
US—Solution too unstable for a spinning process.

EXAMPLE III

Solutions at 17% solids, prepared according to Example II were evaluated with respect to their filterability and gel time which, respectively, measure the solution processability and stability. The filter-ability of a solution of cellulose acetate is measured by comparing either the weight or volume of solution passing through a standard filter in unit time at constant head pressure, and is expressed relative to a standard solution. A filterability constant greater than about ten indicates satisfactory solution processability. The gel time of a solution of cellulose acetate is the time required for a 17 to 18% solution at 40° C. to show a viscosity rise to 1000 poises. The viscosity is measured by the falling ball method. The results of these measurements are shown in Table V.

TABLE V

| Percent acetic acid | W.S. viscosity | Solvent | Filter-ability | Gel time, days |
|---|---|---|---|---|
| 60.0 | 321 | Acetone | 2 | 4 |
| 60.3 | 297 | ----do---- | 6 | 3 |
| 60.0 | 310 | Methyl acetate | 6 | 7 |
| 60.3 | 297 | ----do---- | (¹) | (²) |
| 60.0 | 310 | Methyl acetate/acetone, 60/40 | 13 | ³ 34 |
| 60.1 | 319 | ----do---- | 11 | ³ 21 |

¹ Unfilterable.
² Gel.
³ Solutions still fluid at end of test.

From solutions composed according to this invention, unusually strong, heat-settable cellulose acetate yarns are prepared which provide wet resilience properties, dimensional stability, and fusion temperature equal to those of nominal cellulose triacetate, but with significantly greater toughness and abrasion resistance. The product is relatively non-crystalline, and may be caused to crystallize partially by heating, preferably in the fabric form. As a result of this treatment, the yarns become more dimensionally stable and possess a much higher softening temperature.

The preferred level of combined acetic acid (59.8 to 60.6%) is substantially below that of nominal cellulose triacetate, which ranges from about 61.0 to 62%. Yet these lower acetyl yarns are heat-settable under substantially the same conditions as the nominal triacetate. The lower limit of 59.8% is fixed by the fact that below this value there is an undesirable sharp drop in the fabric safe ironing temperature, paralleled by diminished crystallizability, as determined by X-ray diffraction measurements. The upper limit of 60.6% is fixed by the stability of the novel methyl acetate/acetone solutions. Above this combined acetic acid value, the solution stability is too low to permit use of these solvents in a commercial operation.

The polymer chain length should be as high as is economically obtainable with conventional acetylation equipment. Such practice gives rise to maximum toughness in the product yarn. The polymer chain length, i.e., degree of polymerization (D.P.), is determined from measurements of the W.S. viscosity of a dilute solution, a simple, though indirect indication of its average D.P. A. W.S. viscosity of 310 is the practical limit at present; however, there is no known upper limit. A lower limit of about a W.S. viscosity 240 does exist, based on yarn/yarn abrasion tests and fabric flex abrasion (Stoll) data.

Within the preferred limits of combined acetic acid, neither acetone nor methyl acetate alone, with or without the use of the "cold process," yields spinnable solutions, because of low solution viscosity or solution instability. When a mixture of methyl acetate and acetone, containing from 20 to 80 parts by weight of methyl acetate, is employed in a "cold process," spinnable solutions result. The preferred solvent is a mixture of methyl acetate and acetone containing 64 parts by weight of methyl acetate. The mixed solvent should contain not greater than 0.6% water, a requirement satisfied by many of the solvents presently available on a commercial scale.

The limits of solids concentration are from about 16% to about 18%. The lower limit is determined by spinnability, a complex function of solvent viscosity, and cellulose triacetate composition. Generally, low solids and viscosity lead to poor filament formation, i.e., sticky filaments or to outright non-spinnability. The upper limit is determined by the solution stability, as determined by the gelation time, and depends on the level of combined acetic acid in the cellulose triacetate, its W.S. viscosity, and the solvent. In general, spinnable solutions have a minimum viscosity of about 200 poises at 40° C.

Solutions prepared according to this invention are most useful in the preparation of shaped structures, such as filaments, films, pellicles, and the like, which exhibit improved properties. The shaped structures composed according to this invention find use in woven and knit goods for apparel and home furnishings. In addition, many useful and attractive effects can be achieved by heat-setting the articles to form pleats, folds, moires, or creases, and they can be rendered more functional and attractive by dyeing to satisfactory levels of coloration.

A considerable number of advantages derive from using solutions composed according to this invention. They are eminently suited for many commercial manufacturing operations, particularly for preparing filamentary structures. They are stable, and will remain fluid for more than a month. The improved filterability of the solution is an indication of the utility of the solvent, troublesome undissolved gel particles being at a minimum. The solution viscosity is sufficiently high at useful concentrations, and remains essentially constant over extended periods. The solvent is economical to use, both components being available on a commercial scale, and recoverable subsequent to use in convention acetone (water scrubbing) equipment.

Yarns and the like prepared from cellulose triacetate having the reduced acetyl content disclosed herein possess all the desirable properties characteristic of the nominal cellulose triacetate, with the less desirable characteristics of such compositions being substantially suppressed. Such yarns can be spun in fine deniers, which affords improved fabric aesthetics. Heat treatment of the fabrics will partially crystallize the component yarns to produce articles considerably improved in ease of care properties, dimensional stability during laundering, and safe ironing temperature. Dye penetration is assisted by the heat treatment which drives disperse dyes into the individual yarns. The improved yarn toughness and abrasion resistance facilitates weaving and knitting, and results in improved wear properties of fabrics during ordinary conditions of use.

Many modifications will be apparent to those skilled in the art from the reading of the above without a departure from the inventive concept.

What is claimed is:
1. A composition consisting essentially of (A) cellulose acetate having a combined acetic acid value of from 59.8 to 60.6% and (B) a mixture of methyl acetate and acetone containing from about 20 to about 80% by weight of methyl acetate; the said cellulose acetate being present in the composition in amounts of from about 16 to about 18% by weight.

2. The composition of claim 1 wherein the said mixture contains about 64% by weight of methyl acetate.

3. The composition of claim 1 wherein the cellulose acetate has a combined acetic acid value of about 60.0%.

4. A process for the formation of a composition which comprises contacting, at a temperature below about $-20°$ C., a cellulose acetate having a combined acid value of from 59.8 to 60.0% with a solvent of methyl acetate and acetone containing from about 20 to about 80% by weight of methyl acetate, and thereafter raising the temperature of the mixture until it becomes a fluid solution; the said cellulose acetate being added so that it is present in the composition in amount of from about 16 to about 18% by weight.

5. The process of claim 4 wherein the contacting is carried out at a temperature of about $-50°$ C.

6. The process of claim 4 wherein the said solvent contains about 64% by weight of methyl acetate.

7. The process of claim 4 wherein the cellulose acetate has a combined acetic acid value of about 60.0%.

References Cited in the file of this patent

UNITED STATES PATENTS

| | | |
|---|---|---|
| 2,203,748 | Seymour et al. | June 11, 1940 |
| 2,346,350 | Berl et al. | Apr. 11, 1944 |
| 2,362,182 | Baker | Nov. 7, 1944 |
| 2,697,046 | Brandner | Dec. 14, 1954 |
| 2,839,354 | Moelter | June 17, 1958 |
| 2,862,785 | Finlayson et al. | Dec. 2, 1958 |
| 2,900,669 | Booth | Aug. 25, 1959 |

FOREIGN PATENTS

| | | |
|---|---|---|
| 128,215 | Great Britain | Apr. 29, 1920 |
| 101,002 | Australia | May 20, 1937 |

UNITED STATES PATENT OFFICE
CERTIFICATE OF CORRECTION

Patent No. 2,999,760             September 12, 1961

Arthur Ferreira Cacella et al.

It is hereby certified that error appears in the above numbered patent requiring correction and that the said Letters Patent should read as corrected below.

Column 1, line 21, for "solubility" read -- insolubility --; line 47, before "evaporative" insert -- or --; same column 1, line 58, for "aceptable" read -- acceptable --; column 2, line 58, after "acetone" insert -- solvent --; column 5, line 40, for "springing" read -- spinning --; column 7, line 22, for "convention" read -- conventional --; column 8, line 16, before "acid" insert -- acetic --; line 16, for "60.0%" read -- 60.6% --.

Signed and seale this 27th day of February 1962.

(SEAL)
Attest:

ERNEST W. SWIDER             DAVID L. LADD
Attesting Officer             Commissioner of Patents